C. H. ALLEN AND E. J. TRIMBEY.
PROCESS AND APPARATUS FOR PREPARING PAPER MAKING STOCK.
APPLICATION FILED AUG. 21, 1919.

1,357,760.  Patented Nov. 2, 1920.

INVENTORS

C. H. ALLEN AND E. J. TRIMBEY.
PROCESS AND APPARATUS FOR PREPARING PAPER MAKING STOCK.
APPLICATION FILED AUG. 21, 1919.

1,357,760.

Patented Nov. 2, 1920.
3 SHEETS—SHEET 2.

INVENTORS
Carlton H. Allen
and
Edward J. Trimbey
By their attorney
J. H. McCrady.

INVENTORS
Carlton H Allen
and
Edward J Trimbey.
By their attorney
J H McCready.

UNITED STATES PATENT OFFICE.

CARLTON H. ALLEN AND EDWARD J. TRIMBEY, OF MILLINOCKET, MAINE, ASSIGNORS OF ONE-HALF TO GREAT NORTHERN PAPER COMPANY, OF MILLINOCKET, MAINE, A CORPORATION OF MAINE.

PROCESS AND APPARATUS FOR PREPARING PAPER-MAKING STOCK.

1,357,760.  Specification of Letters Patent.  Patented Nov. 2, 1920.

Application filed August 21, 1919. Serial No. 318,909.

*To all whom it may concern:*

Be it known that we, CARLTON H. ALLEN and EDWARD J. TRIMBEY, citizens of the United States, and both residing in Millinocket, in the county of Penobscot and State of Maine, have invented a new and useful Improvement in Processes and Apparatus for Preparing Paper-Making Stock, of which the following is a specification.

This invention relates to processes and apparatus for preparing a mixture, containing in proper proportions and properly mixed, the various ingredients of the stock used in paper making. Heretofore, so far as we are aware, it has been the practice to prepare batches of the stock by placing in beaters or mixing tanks the correct proportions of the paper making ingredients, such as sulfite, ground wood, clay, color, alum, size, etc. These ingredients are then mixed by agitators, or otherwise and the mixture is drawn off to the Jordan or machine chests and a new batch is prepared in the same manner.

The present invention aims to devise a continuous process which will take the place of the intermittent or batch process heretofore practised and to devise a suitable apparatus with which the process of this invention can be conveniently practised.

The invention will be readily understood from the following description when read in connection with the accompanying drawings, in which—

As above stated, the present invention substitutes for the batch process heretofore practised a continuous process. That is, we continuously pour into a common receiver or trough leading to the Jordan or machine chest, or other storage reservoir, properly proportioned streams of the materials necessary to make a stock of the desired composition for use in paper making machines. The various ingredients are in a fluid state; that is, they are mixed with or dissolved in water so that when they are poured into the common trough the ingredients become intimately mixed by the interference of the stream lines and they thus reach the storage chest properly mixed and ready for delivery to the paper making wire. Provision is made in the apparatus for increasing or decreasing the volumes of materials delivered by the individual streams so that the total volume of the prepared stock can be increased or decreased to suit the requirements of the machines in operation without stopping the continuity of the mixing operation. Provision is also made for varying the flow of the sulfite soft stock or ground wood soft stock to maintain a substantially uniform proportion of dry sulfite and dry ground wood in the mixture delivered to the wire, notwithstanding variations in the consistency of these soft stocks.

Any suitable means for carrying out this process may be adopted but the apparatus shown in the accompanying drawings constitutes on the whole the best mode of which we are aware of applying the method.

Figures 1, 2:
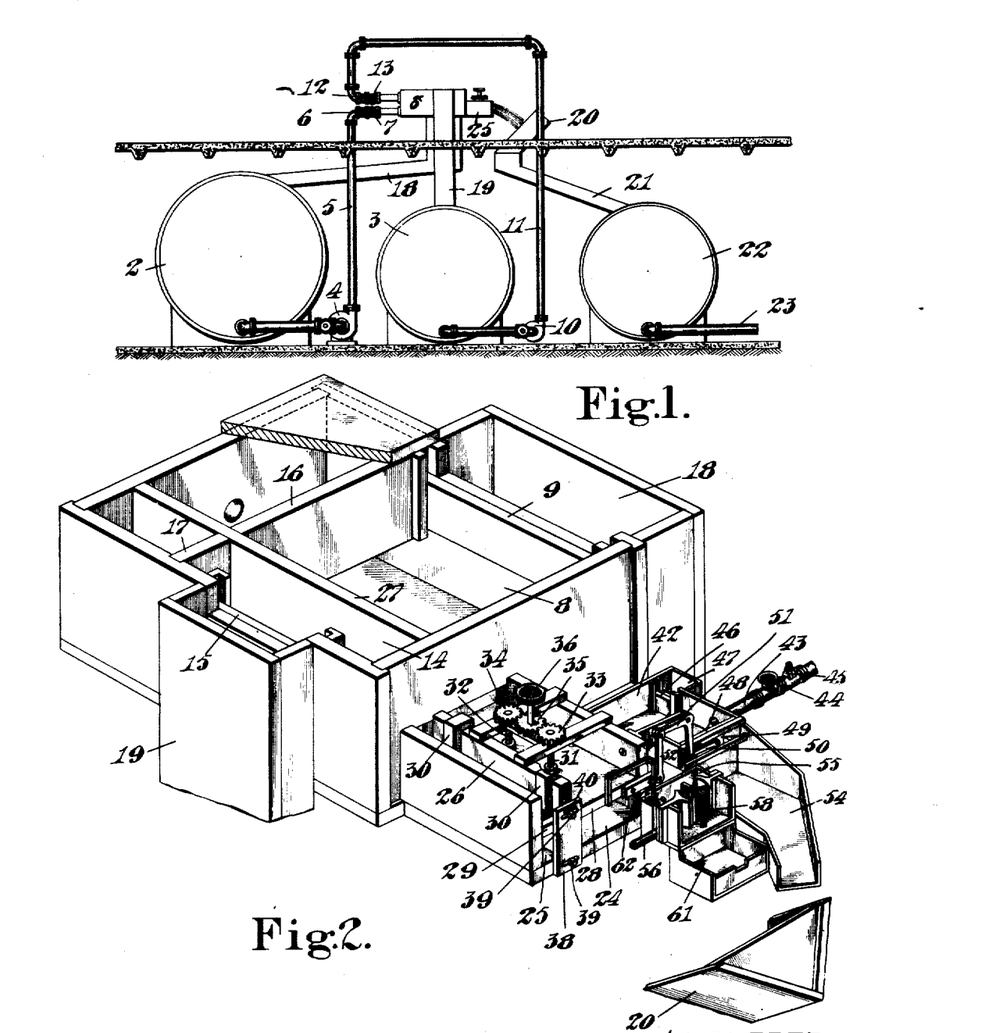
Figure 1 is a view, somewhat diagrammatic, illustrating the general arrangement of an apparatus for practising this invention.
Fig. 2 is an angular view showing the means by which the proportioning and mixing of the various ingredients is effected.

The general arrangement of the larger units of apparatus is shown diagrammatically in Fig. 1. The ground wood and sulfite pulp are mixed in the usual manner with a suitable quantity of water to form what is termed in the trade "soft stock." This stock usually consists of from 2% to 5% of pulp and the remainder water, and it is supplied to suitable vats from any convenient source. In Fig. 1, 2 indicates the ground wood soft stock vat, and 3 the sulfite soft stock vat. The ground wood soft stock is forced by the pump 4 through the pipe 5 and the valves 6 and 7 into a regulating tank 8 provided with an adjustable overflow dam 9. In a similar manner the sulfite soft stock is forced by a pump 10 through a pipe 11 and valves 12 and 13 into a regulating tank 14 having an adjustable overflow dam 15. Baffle plates 16 and 17 are placed in the respective tanks 8 and 14 to reduce the velocity of the soft stock where it enters the tanks. The stock overflowing the dams 9 and 15 is returned to the respective vats 2 and 3 by return spouts 18 and 19, respectively.

The soft stocks delivered to the tanks 8 and 14, in the manner just described, are discharged from these tanks through spouts 24 and 25, respectively, Fig. 2. The individual streams of the fluid mixtures are directed into a common trough 20 in which they become mixed and flow through a spout 21 into a storage reservoir or chest 22 from which they are delivered by the pipe 23 to the paper making machines. As clearly shown in Figs. 2 and 3, the spouts 24 and 25 consist simply of troughs of rectangular cross section. In fact, in the construction shown in the drawings, the two troughs are simply separated by a partition 26 forming a continuation of the partition 27 which separates the tanks 8 and 14. Each trough is provided with an adjustable top which can be raised or lowered to vary the cross sectional area of the outlet opening of the spout, the top of the spout 24 being shown at 28 and that for the spout 25 at 29. These two tops, however, are rigidly connected by brackets 30—30, and an adjusting mechanism operating directly on the top 28 is arranged to raise and lower these tops, the brackets 30—30 operating to cause the two tops to move up and down in unison.

Figure 3:
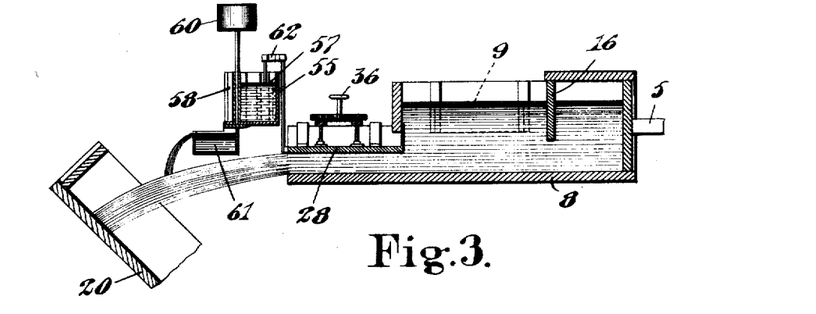
Fig. 3 is a vertical cross sectional view through a part of the apparatus shown in Fig. 2.

This adjustment mechanism comprises two threaded rods 31 and 32, on which are threaded gears 33 and 34, respectively, each having internal threads to engage the threads of the respective rods 31 and 32 and both mounted to rotate on suitable supports but held against vertical movement. Another gear 35, having the same number of teeth as the gears 33 and 34 and located between them, meshes with both the latter gears and has a handwheel 36 secured thereto by which it can be rotated. It is obvious that when the handwheel 36 is revolved the gears 33 and 34 will both be rotated in the same direction, and since these gears are restrained from vertical movement the rotation thus imparted to them will operate through the threaded rods 31 and 32 to raise and lower the tops 28 and 29 of the spouts. The total volume of the pulp discharged through the spouts thus is controlled without changing the relative proportions of the two kinds of pulp.

For the purpose of varying, as may be desired, the relative proportions of the ground wood and sulfite soft stocks in the final mixture, there is secured to the forward end of the spouts, and immediately in front of the partition 26, a plate 38. Bolts 39 projecting through horizontal slots formed in the plate secure it in its operative position and permit adjustment of the plate laterally to cover more or less of the discharge ends of either of the spouts 24 or 25, as may be desired. In other words, the cross sectional areas of the spouts 24 and 25 can be relatively changed, as desired, by making a suitable adjustment of the plate 38 to determine the relative proportions of the ground wood and sulfite in the final mixtures. The spouts 24 and 25 furthermore are constructed and proportioned in accordance with Patent No. 1,178,973, granted April 11, 1916, to E. J. Trimbey, so that the frictional resistance offered by the spout to the flow of the soft stock therethrough will be inversely proportioned to the consistency of the soft stock. Thus an approximately constant equivalent weight of dry sulfite or ground wood pulp will be discharged through each spout per unit of time, for any given adjustment of their cross sectional areas, notwithstanding variations in the quantity of water with which the pulp is mixed; or, in other words, notwithstanding variations in the consistency of the soft stock.

Furthermore, the lengths of the overflow dams 9 and 15 are made approximately proportional to the average proportion of the ground wood and sulfite used in the complete mixture so that when the flow of stock to the paper machines is materially reduced for any reason and the overflow of both the ground wood and sulfite soft stocks are correspondingly increased, there will be the same increase in the depths of stock passing over the two overflow dams.

A scale 40, Fig. 2, on the upper edge of the plate 38 acts as a gage to show the relative proportions of ground wood and sulfite being used in the mixture.

It will now be understood that when the apparatus is in operation continuous streams of ground wood and sulfite soft stocks will be discharged through the spouts 24 and 25 in predetermined proportions, these streams falling into the trough or receiver 20 where they will be intimately mixed as they flow into the receptacle 22.

The other ingredients used, such as clay, color, alum, size, etc., are added in dilute liquid form. For the clay or other filler a weir box 42, Fig. 2, is used, the mixture of clay and water being supplied to the box through a pipe 43 controlled by valves 44 and 45. An adjustable overflow dam 46 maintains a predetermined level of the mixture in the box or tank, and the spout 47 returns the overflow to the source of supply. One side or wall 48 of the weir is stationary while the other side consists of a movable plate 49 mounted to slide in suitable ways and connected by a link 50 to one arm of a bell crank lever 51, the other arm of this lever being connected by a link 52 to the adjustable top 28 of the spout 24, so that as this top is raised or lowered to increase or decrease the proportions of the ground wood and sulfite soft stock, the volume of clay or other filler will be correspondingly increased or decreased. The mixture of clay and water flowing through the weir is conducted into a trough or spout 54 which directs the stream of fluid mixture into the common mixing trough 20.

The same construction used for controlling the flow of clay can also be used for controlling the color added to the stock where the volume required is great enough to give sufficient accuracy by the use of the weir. For smaller volumes the color may conveniently be supplied to a regulating tank 55, Figs. 2 and 3, through a pipe 56 controlled by two valves similar to the valves 44 and 45 for the clay tank. This tank is equipped with an adjustable overflow dam 57 and suitable means for returning the overflow to the supply tank. In the front side of the tank 55 is located a revolving valve 58 mounted to rotate between two stationary abutments curved to fit the peripheral edges of the valve so that normally this valve with its coöperating abutments prevent any substantial leakage or direct flow from the tank 55. The valve 58 is rotated at a constant speed from any convenient source of power, as for instance mill power belted to the pulley 60, Fig. 3, and as each compartment in the valve comes into communication with the liquid in the tank, the compartment fills to a depth determined by the level within the tank. Further rotation of the valve carries this compartment into alinement with one of the stationary side pieces or abutments, and still further rotation carries the compartment out of contact with the abutment and allows the liquid entrapped in the compartment to flow out into a receptacle 61 lying immediately below and in front of the tank 55. From this receptacle the color flows at a relatively constant rate through a notch in the forward edge of the receptacle into the receiver or mixing trough 20.

The adjustable overflow dam 57 is joined by connections 62 to the adjustable top 28 of the ground wood discharge spout 24, so that as this top is raised or lowered to vary the proportion of ground wood soft stock delivered to the receiver 20, the dam 57 for the color tank will also be raised or lowered and, since the volume measured out by the rotating valve 58 is proportional to the depth of the liquid in the tank 55, this adjustment of the dam will vary the volume of the color delivered so as to maintain the desired proportions in the final mixture. If it is desired to vary the proportions of the color and pulp, it is merely necessary to vary the concentration of the color solution or to change the speed of rotation of the valve 58, or to vary the adjustment of the connection 62.

The size, alum and other ingredients in dilute liquid form, can be added to the stream in the trough 20 by either of the arrangements above described for adding clay or color. All these ingredients are delivered in fluid form to the spout 20 which preferably is constructed with a V-shaped bottom, as shown in Fig. 2, and in flowing through this trough and through the spout 21 the ingredients become intimately mixed by the interference of the stream lines. The final mixture may either flow by gravity or be pumped to the Jordan chests, machine chests, or other storage chests, as desired. In the arrangement illustrated in Fig. 1, the vats 2 and 3 are located below the level of the regulating tanks from which the streams flow into the trough 20 and the overflow from these tanks is returned to the vats by gravity. It is obvious, however, that it might be more convenient in some plants to locate the vats above the level of the regulating tanks so that the flow from the vats to the tanks would take place by gravity and the overflow would be pumped back to the vats.

The valves 7, 13 and 44, and the corresponding valves for the other regulating tanks used, are hand-operated and are used to control the supply to the various regulating tanks so as to give some excess stock or solution from each tank. In the event that the supply of one of the ingredients should become exhausted, due to any cause, provision is made for automatically cutting off the supply of all the ingredients and for sounding an alarm to call the attention of the attendant to the trouble. It is for this purpose that the valves 6, 12 and 45 are provided and a similar valve arrangement is also provided to control the supply of material to each of the other regulating tanks employed, it being understood that the number of tanks used will vary with the number and nature of the ingredients. In some cases however, it may be possible to mix certain of the ingredients in one vat or source of supply and furnish this mixture to a single regulating tank and thus reduce the number of tanks employed.

Figure 6:
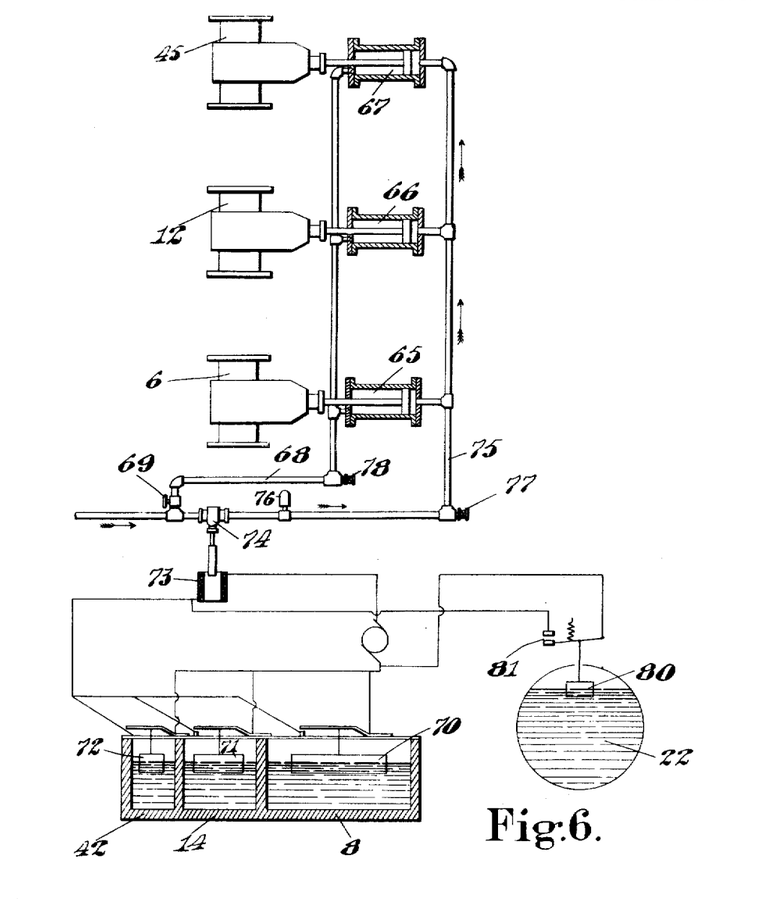
Fig. 6 is a diagram showing another automatic controlling mechanism.

The automatic controlling apparatus just mentioned is shown diagrammatically in Fig. 6. In this arrangement the stems of the valves 6, 12 and 45 are each connected to plungers which work in cylinders 65, 66 and 67, respectively. Compressed air is supplied to these cylinders through a pipe 68 controlled by a hand-operated valve 69. When the apparatus is set into operation, therefore, the attendant opens the valve 69 thus admitting compressed air to the several cylinders and opening the valves 6, 12 and 45. The valves remain in this condition until they are shut off by the attendant or the supply of one of the ingredients fails.

It will be seen that the regulating tanks 8, 14 and 42 are provided with floats 70, 71 and 72 respectively, each arranged to operate an electric switch which normally is held open, and any one of which switches, when closed, serves to energize a solenoid 73 which actuates a valve 74 that admits compressed air through a pipe 75 to the opposite ends of the cylinders 65, 66 and 67 and thus closes the valves 6, 12 and 45 and shuts off the flow of the ingredients to the different regulating tanks. The admission of compressed air to the pipe 75 also blows a whistle 76 to call the attendant's attention to the shut-down. The valves 77 and 78 are relief valves.

While only three of the valves controlling the supply of ingredients to the various regulating tanks are shown, it will be understood that the flow of other ingredients is controlled in the same manner. The illustration of additional valves, however, is obviously unnecessary to show the arrangement and operation of the system.

It will be clear that this automatic apparatus is in the nature of a safety system since it cuts off completely the flow of the various ingredients that unite to form the paper making stock whenever the supply of one of these ingredients becomes so far reduced as to affect materially its proportion in the final mixture or, in other words, when this reduction would have an adverse effect on the composition of the paper making stock.

If so many of the paper making machines should be shut down that the mixing apparatus supplies enough excess stock to the tank or vat 22 so that there is danger of overflowing the vat 22, the entire flow of stock may be cut off by a float 80 in the vat 22 arranged to operate a switch 81 which also energizes the solenoid 73 when the level of the stock mixture in the receptacle 22 rises above a predetermined height. This mechanism thus operates to shut down the entire mixing apparatus in the same manner that it would be shut down if one of the ingredients failed, as above described.

Figure 7:
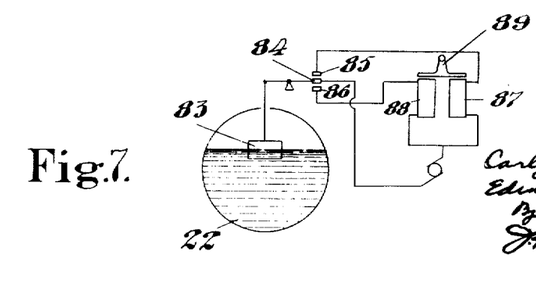
Fig. 7 is a diagrammatic view showing the general organization of the controlling mechanism that includes the parts shown in Figs. 4 and 5.

Provision is made for automatically adjusting the volumes of material delivered by the various streams of ingredients in response to the demands of the machines supplied. For this purpose another float 83, Fig. 7, is mounted in the receptacle 22 and controls the position of a contact 84 connected with one terminal of a source of electricity, this contact being movable between two other contacts 85 and 86, respectively, which are connected to solenoids 87 and 88. The opposite terminals of these solenoids are connected to the other terminal of the source of electricity.

Figures 4, 5:
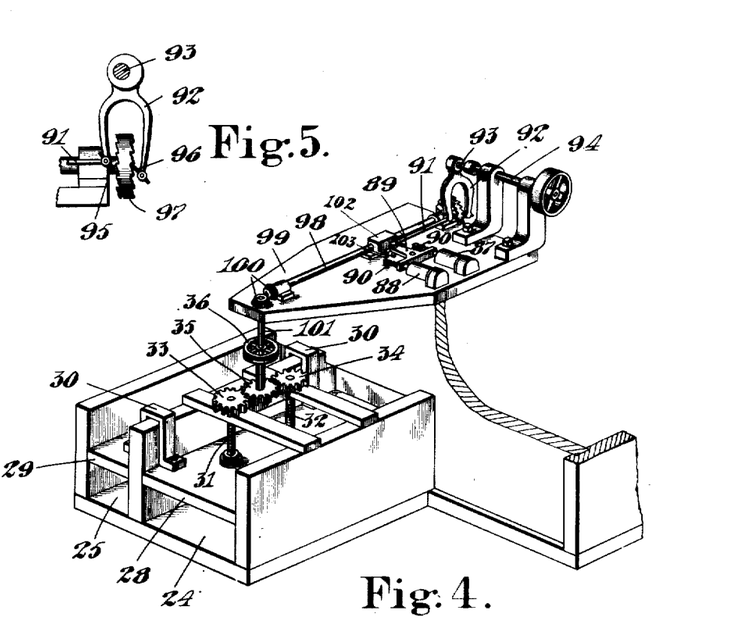
Fig. 4 is an angular view showing a part of an automatic controlling mechanism which preferably forms a part of the apparatus.
Fig. 5 is a side elevation showing a part of the mechanism shown in Fig. 4.

Referring to Fig. 4 it will be seen that the plungers of the two solenoids are connected to the opposite ends of the cross-bar of a T-shaped lever 89. Springs 90—90 operate on the opposite arms of this lever and tend to hold it in its neutral or middle position. When the demands of the paper making machines increase sufficiently to cause a lowering of the level of the float 83 beyond a predetermined point, the movable contact 84 engages the contact 85 thus energizing the solenoid 87 and tipping the lever 89 in a clockwise direction about its fulcrum. This movement will be transmitted through a link 91 to a double-armed swinging pawl 92 which is eccentrically mounted on a shaft 93 that is constantly rotated from some convenient source of power. The member 92 thus is constantly reciprocated and it carries two pawl points 95 and 96, respectively, arranged to engage with oppositely directed teeth formed on the opposite faces of a ratchet wheel 97 that is mounted fast on a horizontal shaft 98 which rotates in suitable bearings on a support 99 secured to the top of the regulating tank 8. Consequently, when the pawl 92 is swung in the direction indicated, the point 95 will engage the teeth on the left-hand side of the ratchet wheel 97, as the parts appear in Fig. 5, and will rotate the shaft 98. This rotative movement is transmitted through bevel gears 100 to a vertical shaft 101 fast on the shaft on which the handwheel 36 and the gear 35 are mounted. This step by step rotative movement will raise the adjustable tops 28 and 29 of the spouts 24 and 25 and effect a corresponding adjustment of the other members controlling the flow of ingredients to the spout 20 and will increase the volume of each of the streams of ingredients.

If, however, some of the paper making machines should be shut down so that the vat 22 filled to an undesirably high point, the float 83 then would be raised, thus moving the contact 84 into engagement with the contact 86 and energizing the solenoid 88 which would operate through the connections above described to move the pawl point 96 into engagement with the right-hand side of the ratchet wheel 97 and thus operate through the connections with the adjustable top 28 to lower this top and decrease the flow of the various ingredients. Upon the interruption of the engagement of the contact 84 with either of the contacts 85 or 86, the T-shaped lever 89 will be returned to its neutral position by the springs 90—90, thus stopping or interrupting the adjusting movement of the top 28.

In view of the fact that this step by step adjusting mechanism operates rather slowly, it is desirable to use with it a mechanical means for automatically stopping the adjusting action after a substantially predetermined adjustment has been made. Such an arrangement is illustrated in Fig. 4 in which the shaft 98 is threaded for a portion of its length to receive a block 102 that lies flat against the support 99, or on a plate mounted on said support. This block is provided with two arms arranged to engage opposite sides of a pin 103 secured in the upper end of the lever 89. It will be clear from an inspection of Fig. 4 that when the lever 89 has been tipped in one direction or the other through the energizing of one or the other of the solenoids 87 and 88, and the shaft 98 thus is being rotated step by step to effect an adjustment of the flow of the various ingredients, this rotation of the shaft will move the block 102 in a direction tending through the engagement of one of the arms on the block with the pin 103 to restore the lever 89 to its neutral position, and this restoring operation will be effected if the electrical apparatus does not itself first produce such a restoration.

In case a great number of the paper making machines supplied from this mixing apparatus should be shut down at substantially the same time, the flow adjusting mechanism above described might not operate quickly enough to prevent the vat 22 from filling up and overflowing; but any danger from this source is prevented by the safety apparatus operated by the float 80.

What is claimed as new is:

1. The process of mixing paper making ingredients to form a stock suitable for delivery to paper making machines which consists in making fluid mixtures or solutions of the several ingredients of the stock, continuously pouring the fluid mixtures or solutions so prepared into a common stream, and proportioning the volumes delivered by the individual streams to cause their union in said common stream to form a paper making stock of the desired composition.

2. The process of mixing paper making ingredients to form a stock suitable for delivery to paper making machines which consists in making fluid mixtures or solutions of the several ingredients of the stock, continuously pouring the fluid mixtures or solutions so prepared into a common stream, proportioning the volumes delivered by the individual streams to cause their union in said common stream to form a paper making stock of the desired composition, continuously delivering the stock so prepared to the paper making machines, and automatically varying the quantities of the individual ingredients of the stock so delivered in response to variations in the requirements of the machines so supplied.

3. The process of mixing pulp soft stock with other paper making ingredients to make a paper making stock suitable for delivery to paper making machines, which consists in making a fluid mixture or solution of each of said other ingredients, continuously pouring a stream of said pulp soft stock into a suitable receiver, continuously pouring into said receiver streams of the other ingredient mixtures or solutions to cause all of said streams to unite to form a common stream in which the ingredients will become mixed to form a paper making stock, automatically varying the volume of the pulp soft stock so delivered to maintain a substantially uniform proportion of dry pulp in said common stream notwithstanding variations in the consistency of said soft stock, and proportioning the volumes delivered by the respective streams to cause their union into said common stream to form a paper making stock of the desired composition.

4. The process of mixing paper making ingredients to form a stock suitable for delivery to paper making machines which consists in making a suitable fluid mixture or solution of each ingredient, said ingredients including ground wood pulp and sulfite pulp, continuously pouring the fluid mixtures or solutions so prepared in individual streams into a common stream leading to the paper making machines, proportioning the individual streams to cause their union into said common stream to form a paper making stock of the desired composition, and automatically varying the flow of the ground wood and sulfite soft stock streams in accordance with the consistency of said streams to maintain a substantially uniform proportion of dry sulfite and dry ground wood in the stock notwithstanding variations in the amount of water in which the sulfite pulp or ground wood pulp are carried.

5. An apparatus for mixing paper making ingredients to make a stock of suitable composition for delivery to paper making machines, comprising, in combination, a receiver for the prepared stock, means for continuously delivering individual streams of fluid mixtures or solutions of the ingredients to said receiver whereby the ingredients become mixed in said receiver, and means for regulating the proportions of the ingredients so delivered to said receiver to control the composition of the stock so prepared.

6. An apparatus for mixing paper making ingredients to make a stock of suitable composition for delivery to paper making machines, comprising, in combination, a receiver for the prepared stock, means for continuously delivering individual streams of fluid mixtures or solutions of the ingredients to said receiver whereby the ingredients become mixed in said receiver, means for regulating the proportions of the ingredients so delivered to said receiver to control the composition of the stock so prepared, and means for automatically varying the volumes of the respective ingredients delivered by said individual streams to control the volume of the prepared stock in accordance with the requirements of the paper making machines supplied.

7. An apparatus for mixing paper making ingredients to make a stock of suitable composition for delivery to paper making machines, comprising, in combination, a receiver for the prepared stock, means for continuously delivering individual streams of fluid mixtures or solutions of the ingredients to said receiver whereby the ingredients become mixed in said receiver, means for regulating the proportions of the ingredients so delivered to said receiver, to control the composition of the stock so prepared, and means for automatically stopping the flow of said streams upon a substantial reduction in the proportion of any of said ingredients so supplied.

8. An apparatus for mixing pulp soft stock with other ingredients to make a stock of suitable composition for delivery to paper making machines, comprising, in combination, a receiver for the prepared stock, and means for delivering into said receiver a continuous stream of said soft stock and continuous streams of fluid mixtures or solutions of said other ingredients, whereby said ingredients become intimately mixed in said receiver, the means for delivering said stream of pulp soft stock being operative to vary automatically the volume of soft stock delivered by said stream to maintain in the ultimate mixture a substantially constant proportion of dry pulp notwithstanding variations in the consistency of said soft stock.

9. An apparatus for mixing paper making ingredients to make a stock of suitable composition for delivery to paper making machines, comprising, in combination, a series of tanks for the respective ingredients, means for continuously delivering fluid mixtures or solutions of the ingredients to the respective tanks, and a receiver into which streams from said tanks flow and in which the ingredients thus become mixed preparatory to flowing to said machines.

10. An apparatus for mixing paper making ingredients to make a stock of suitable composition for delivery to paper making machines, comprising, in combination, a series of tanks for the respective ingredients, means for continuously delivering fluid mixtures or solutions of the ingredients to the respective tanks, a receiver into which streams from said tanks flow and in which the ingredients thus become mixed preparatory to flowing to said machines, and means whereby the proportions of said ingredients delivered from said tanks to said receiver may be varied to change the composition of the stock formed by the union of said streams.

11. An apparatus for mixing paper making ingredients to make a stock of suitable composition for delivery to paper making machines, comprising, in combination, a series of tanks for the respective ingredients, means for continuously delivering fluid mixtures or solutions of the ingredients to the respective tanks, a receiver into which streams from said tanks flow and in which the ingredients thus become mixed preparatory to flowing to said machines, and means for automatically varying the volume of the ingredients supplied to said receiver in response to the requirements of the machines so supplied.

12. An apparatus for mixing pulp soft stock with other paper making ingredients to form a stock of suitable composition for delivery to paper making machines, comprising, in combination, a series of tanks for the respective ingredients, means for continuously delivering the soft stock and fluid mixtures or solutions of the other ingredients to their respective tanks, a receiver into which streams from said tanks flow and in which the ingredients thus become mixed preparatory to delivery to said paper making machines, and means for automatically maintaining the relative proportions of said ingredients in the final mixture substantially constant notwithstanding variations in the consistency of the soft stock.

13. An apparatus for mixing pulp and other paper making ingredients to make a stock of suitable composition for delivery to paper making machines, comprising, in combination, a series of overflow tanks for the respective ingredients, means for delivering the pulp in the form of soft stock and fluid mixtures or solutions of the other ingredients to the respective tanks, a discharge spout for the soft stock tank through which the soft stock is discharged from said tank, and a receiver into which the stream from said spout and the streams from the other tanks flow to form a common stream in which the ingredients are mixed preparatory to flowing to the paper making machines, said spout being constructed and proportioned to vary automatically the flow of the soft stock therethrough in inverse proportion to the consistency of said stock.

14. An apparatus for mixing ground wood and sulfite soft stocks preparatory to delivery to paper making machines, comprising, in combination, a tank for each of said ingredi its, each of said tanks being provided with an overflow dam, means for continuously delivering said soft stocks to their respective tanks in quantities sufficient to cause them to overflow said dams, a discharge spout for each of said tanks, said spouts being constructed and proportioned to vary automatically the quantity of stock flowing therethrough in inverse proportion to the consistency of the stock, and a common receiver into which the streams from said spouts flow and in which the ingredients thus become mixed preparatory to flowing to the paper making machines.

15. An apparatus for mixing ground wood and sulfite soft stocks preparatory to delivery to paper making machines, comprising, in combination, a tank for each of said ingredients, each of said tanks being provided with an overflow dam, means for continuously delivering said soft stocks to their respective tanks in quantities sufficient to cause them to overflow said dams, a discharge spout for each of said tanks, said spouts being constructed and proportioned to vary automatically the quantity of stock flowing therethrough in inverse proportion to the consistency of the stock, a common receiver into which the streams from said spouts flow and in which the ingredients thus become mixed preparatory to flowing to the paper making machines, and means for automatically varying the volume of the soft stocks delivered from said tanks in accordance with the requirements of the paper making machines supplied therefrom.

16. An apparatus for mixing ground wood and sulfite soft stocks preparatory to delivery to paper making machines, comprising, in combination, a tank for each of said ingredients, each of said tanks being provided with an overflow dam, means for continuously delivering said soft stocks to their respective tanks in quantities sufficient to cause them to overflow said dams, a discharge spout for each of said tanks, said spouts being constructed and proportioned to vary automatically the quantity of stock flowing therethrough in inverse proportion to the consistency of the stock, a common receiver into which the streams from said spouts flow and in which the ingredients thus become mixed preparatory to flowing to the paper making machines, the lengths of said overflow dams for the ground wood and sulfite soft stock tanks being substantially proportional to the average proportions of the ground wood and sulfite stocks used in the paper making stock.

17. An apparatus for mixing paper making ingredients to make a stock of suitable composition for delivery to paper making machines, comprising, in combination, a receptacle for the prepared stock, means for continuously delivering streams of fluid mixtures or solutions of said ingredients to said receptacle so delivered to control the position of the stock so prepared, and means for automatically stopping the flow of said stream when said receptacle becomes filled above a substantially predetermined level.

18. An apparatus for mixing paper making ingredients to make a stock of suitable composition for delivery to paper making machines, comprising, in combination, a receptacle for the prepared stock, means for continuously delivering streams of fluid mixtures or solutions of said ingredients to said receptacle so delivered to control the position of the stock so prepared, and means for simultaneously varying the flow of the streams of said ingredients to control the volume of the prepared stock in accordance with the requirements of the paper making machines supplied.

19. An apparatus for mixing paper making ingredients to make a stock of suitable composition for delivery to paper making machines, comprising, in combination, a receptacle for the prepared stock, means for continuously delivering streams of fluid mixtures or solutions of said ingredients to said receptacle so delivered to control the position of the stock so prepared, and means including an electrical controlling apparatus for automatically adjusting the flow of said streams of ingredients to control the volume of stock so prepared in accordance with the requirements of the machines supplied.

20. An apparatus for mixing paper making ingredients to make a stock of suitable composition for delivery to paper making machines, comprising, in combination, a receptacle for the prepared stock, means for continuously delivering streams of fluid mixtures or solutions of said ingredients to said receptacle so delivered to control the position of the stock so prepared, a float in said receptacle and means including an electrical connection controlled by said float for controlling the flow of said ingredients to said receptacle.

21. An apparatus for mixing paper making ingredients to make a stock of suitable composition for delivery to paper making machines, comprising, in combination, a series of tanks for the respective ingredients, means for continuously delivering fluid mixtures or solutions of the ingredients to the respective tanks, a receiver into which streams from said tanks flow and in which the ingredients thus become mixed preparatory to flowing to said machines, valves controlling the flow of said fluid mixture or solutions to the respective tanks, a float in each of said tanks, and means controlled by said floats for closing all said valves when the level of the liquid in any one of said tanks drops below a predetermined point.

22. An apparatus for mixing ground wood and sulfite soft stocks preparatory to delivery to paper making machines, comprising, in combination, a plurality of regulating tanks, one for each of said ingredients, means for continuously delivering said soft stocks to their respective tanks, a discharge spout for each of said tanks, means for automatically varying the cross sectional area of said discharge spouts to vary the flow of stock therethrough in accordance with the requirements of the paper making machines supplied therefrom, and additional means for adjusting the relative proportions of the stocks flowing through said discharge spouts.

23. In an apparatus for automatically controlling the flow of fluids, the combination of a fluid conduit, adjustable means for controlling the flow of fluid therethrough, driven mechanism for operating said adjustable means, a driving mechanism arranged to be connected to or disconnected from said driven mechanism, electrical means operative to control the connection between said driving and driven mechanisms, and means responsive to changes produced by said flow of fluid for controlling said electrical means.

24. In an apparatus for automatically controlling the flow of fluids, the combination of a fluid conduit, adjustable means for controlling the flow of fluid therethrough, driven mechanism for operating said adjusting means step by step, a constantly operated driving mechanism arranged to be connected to or disconnected from said driven mechanism, electrical means operative to control the connection between said driving and driven mechanisms, and means responsive to changes produced by said flow of fluid for controlling said electrical means.

In testimony whereof we have signed our names to this specification.

CARLTON H. ALLEN.
EDWARD J. TRIMBEY.